United States Patent [19]
Walker

[11] Patent Number: 5,819,688
[45] Date of Patent: Oct. 13, 1998

[54] PET ANIMAL ODOR ADSORBING AND LIQUID ABSORBING MAT

[76] Inventor: Robert T. Walker, 7155 Santa Monica Blvd., Los Angeles, Calif. 90046

[21] Appl. No.: 845,240

[22] Filed: Apr. 21, 1997

[51] Int. Cl.$^6$ .................................................. A01K 1/015
[52] U.S. Cl. ........................................... 119/169; 119/526
[58] Field of Search .................... 119/28.5, 169, 119/173, 526

[56] References Cited

U.S. PATENT DOCUMENTS

| | | | |
|---|---|---|---|
| 2,081,334 | 5/1937 | Kickenbush | 119/526 |
| 2,243,857 | 6/1941 | Fischer | 119/526 X |
| 4,364,331 | 12/1982 | Foenard | 119/526 |
| 4,437,429 | 3/1984 | Goldstein et al. | 119/173 |

*Primary Examiner*—Robert P. Swiatek
*Attorney, Agent, or Firm*—Robert J. Schaap

[57] ABSTRACT

A pet animal odor absorbing mat comprising a mat or pad formed of a fibrous material, such as a cellulosic material, and which is integrally incorporated with a zeolite mineral during the manufacture of the mat. The pad or mat is primarily based on the cellulosic or other fibrous material such as for example, wood fiber. The wood fibers are mixed with a binding agent such as an acrylic latex or other animal non-toxic binder, and the zeolite while in somewhat of a semi-viscous and semi-liquid state and then allowed to harden. The mat is highly effective for use as a bottom layer in cat litter boxes to absorb both urine or other wetness and highly effective, in literally entrapping odors, such as those odors arising from pet animals. The mat thereupon simultaneously releases oxygen. This type of mineral has been found to be particularly effective in removing those odors arising both from the animal urine, as well as other animal excreta.

30 Claims, 2 Drawing Sheets

PET ANIMAL ODOR ADSORBING AND LIQUID ABSORBING MAT

BACKGROUND OF THE INVENTION

1. Field of the Invention

This invention relates in general to certain new and useful improvements in odor absorbing media and more particularly, to an odor absorbing mat for pet animals and particularly for use in pet animal litter boxes and, which is capable of absorbing most, if not all, of the odors normally emanating from the discharge products of a pet animal.

2. Brief Description of the Related Art

Although many people find pet animals to be a welcomed addition to their family unit, one of the major problems associated with most pet animals is the odors, and usually unpleasant if not obnoxious odors, which arise from the waste products, such as urine and solid excreta, of the animal. In recent years, it has been found that pet animals, such as dogs and cats, also improve the environment and attitudes of aging people, particularly in homes for people of advanced age and people who have ailments which require their confinement.

Cats are particularly desirable for use in rest homes and the like since they are small, easy to hold, and have relatively soft hair which generally imparts a pleasing feeling when petting the animal. However, cats typically require litter boxes in order to discharge urine and solid waste products. However, many of the elderly people and people who have ailments are not typically prepared to deal with the odors arising from pet animals, and also may have little or no means of removing those odors when they are generated.

In particular, the most offensive odors from the animal usually are those arising from the urine and excrement of the animal. This is particularly true in the case of litter boxes, such as cat litter boxes. Although many litter manufacturers have attempted to incorporate perfume masking agents in the litter, these scent providing agents only emit an odor which is designed to exceed those emanated by the pet animal, and therefore only serve to mask the offensive odor. Beyond this, they do not remove any of the offensive odors. In addition, many commercially available cat litter are not effective in absorbing any substantial quantities of liquid such as urine. As a result, the urine often times settles to and remains at the bottom of the litter box.

There has been a need for a product, such as a mat or pad, which is capable of absorbing urine and which will also adsorb, remove and entrap offensive odors from the animal or discharge of the animal.

OBJECTS OF THE INVENTION

It is, therefore, one of the primary objects of the present invention to provide an odor capturing animal mat, which is highly effective for pet animals, and which is capable of literally absorbing liquids and adsorbing the odors emanating from that pet animal and particularly the waste products of that pet animal.

It is another object of the present invention to provide an odor adsorbing animal mat of the type stated in which a mat can be integrally incorporated with an odor adsorbing agent and a liquid absorbing agent, and which may be effective for the life of that mat.

It is a further object of the present invention to provide an odor-removing mat for pet animals of the type stated, and which is capable of absorbing a substantial amount of waste liquid such as animal urine, as well as adsorbing the odors emanating from the discharge of the animal.

It is also an object to the present invention to provide an odor adsorbing mat for use with cat litter boxes which is impregnated with a zeolite mineral.

It is an additional object of the present invention to provide an odor adsorbing mat for pet animals of the type stated which can be made in a variety of different shapes and sizes to accommodate differing sized litter boxes.

It is another important object of the present invention to provide an odor adsorbing mat for pet animals of the type stated which can be made at a relatively low cost and has a reasonably long, effective life span, and is highly functional in use.

It is another salient object to the present invention to provide a method of making an odor adsorbing and wetness absorbing mat for use with animals.

With the above and other objects in view, my invention resides in the novel features of form, construction, arrangement and combination of parts and components, and compositions as hereinafter described and pointed out in the claims.

BRIEF SUMMARY OF THE INVENTION

A pet animal odor adsorbing mat which is capable of adsorbing and removing odors generated by a pet animal and particularly the odors arising from the discharge products, such as the excrement and urine of an animal. The odor adsorbing mat of the present invention exists in the form of a fibrous mat, which is adapted for disposition in an animal litter box, although it can be used in other environments. The odor adsorbing mat contains an odor adsorbing mineral incorporated therewith to literally adsorb and remove offensive odors.

The odor adsorbing mat of the present invention may be constructed of fibrous base materials which will lend to the ability to readily and easily absorb a substantial amount of liquid discharge of an animal. This base material may be a cellulosic fibrous material such as fiber, as hereinafter described. Incorporated with the fiber material during the actual manufacture thereof, is a zeolitic mineral, such as a mordenite, and which attracts and may chemically interact with and literally trap odors and gasses from an animal body and particularly the discharge of the animal body, and simultaneously releases oxygen to the surrounding environment. In addition, this mineral may also effectively remove some bacteria and virus, as opposed to merely masking odors and bacteria and virus.

The use of the zeolite material in the animal mat has been found to be highly effective, since it is totally odorless in and of itself, and moreover, is non-toxic. Moreover, the material in a mineral form, is not an irritant to animal bodies. Thus, if an animal should come into contact with the mat, or for that matter even the zeolite mineral in the mat, even for an extended period of time, it will not cause any irritation to the animal body. The mat of the present invention is uniquely designed for use in a cat litter box. Thus, it will normally fit within the bottom of the box and with the litter disposed on top of the mat. However, the mat is capable of being used in other environments in order to absorb wetness and also to adsorb odors emanating from animal discharge.

Many animals, such as cats, tend to scratch upon mats, and may, in the process, damage or destroy that mat. In this case, the zeolite mineral, as well as the other components of the mat, are relatively harmless to a pet animal, even if accidentally ingested by the animal. In addition, the mat is constructed so that it is generally firm and hardened to be resistant to scratching and also has a textured upper surface.

The zeolite mineral which is used is preferably a non-metallic mordenite mineral, comprising a viterous silica, such as a viterous silicon dioxide, with the next major component being an aluminum oxide. The mordenite mineral has only a very low content of ferric oxides, usually no more than about 5% of the total content. The mordenite is a naturally occurring mineral obtained from a whole rock form.

The zeolite minerals are highly effective in entrapping odors, in that they have very large internal surface areas and also occur with an actual negative electric charge. In this way, the zeolite minerals can act much in the same manner as a negative ion generator in that they will attract positively charged odor particles. Moreover, because of the large internal surface area, they will also effectively physically entrap these odors. The zeolite minerals are effective in the present invention in that they do not swell in the presence of liquids, such as water, which makes them highly efficient and practical for use in this invention.

In order to use the zeolite mineral, and preferably the mordenite, in accordance with the invention, the mineral is heated to a temperature within the range of about 300 degrees to about 375 degrees F., and preferably to about 340 degrees F., in order to expel any encapsulated moisture. Although numerous metals such as calcium, cobalt, copper, lead, magnesium and the like may be present, they are generally present in very minor amounts and therefore the mineral is still considered to be non-metallic. Further, these metal compounds when present, usually exist in the form of metal oxides.

In order to incorporate the mordenite or other zeolite mineral into a mat, it is mixed with a cellulosic fiber, such as a pulp wood fiber, and with a binding agent, such as an acrylic latex. A filler, such as a paper mache (papier mache) filler, may be added, if desired and may also function as a binding agent. This mass is then formed into a mat by mixing of the wood fiber pulp and the zeolite mineral and binder into a relatively fixed slurry. The slurry is then introduced into a mold which is then press heated to expel the water and thereby form the final mat.

The mat of the present invention has a threshold absorption level both for odors and for liquid. However, the mat can be recycled and effectively reactivated by merely permitting the mat to remain in an air environment for a period of time. In this way, the odors will be released and the moisture will evaporate thereby reactivating the mat. However, the mat can be provided in disposable form at a low cost and may be readily disposed of after use.

The mat of the present invention has been described as an odor adsorbing mat. However, it should be understood that this mat is also a liquid absorbing mat.

The present invention thereby provides an odor-adsorbing mat and associated method, which has many other objects and advantages. These objects and advantages will become more fully apparent from a consideration of the forms in which they may be embodied. One of the forms of this mat and one of the preferred methods of making the mat is more fully described in the following detailed description of the invention, and is more fully illustrated in the accompanying drawings. Therefore, it should be understood that the following detailed description and the accompanying drawings, are set forth only for purposes of illustrating general principles of the invention, and are not to be taken in a limiting sense.

BRIEF DESCRIPTION OF THE DRAWINGS

Figure 1:
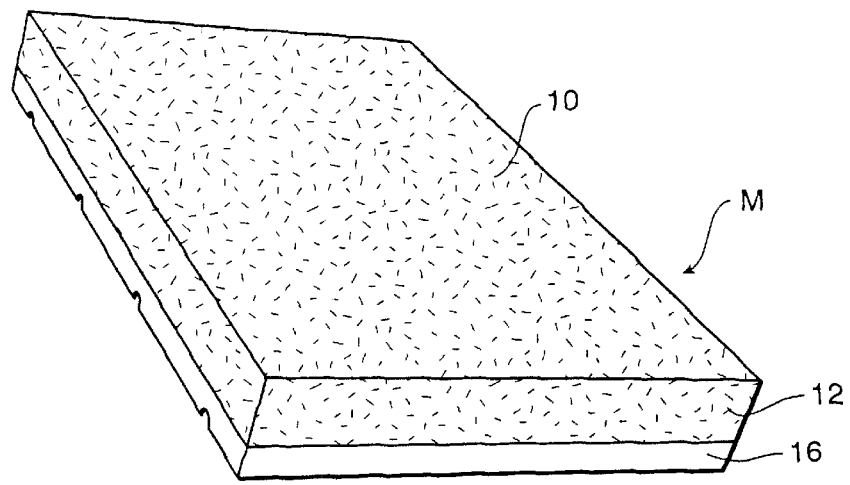
Figure 2:
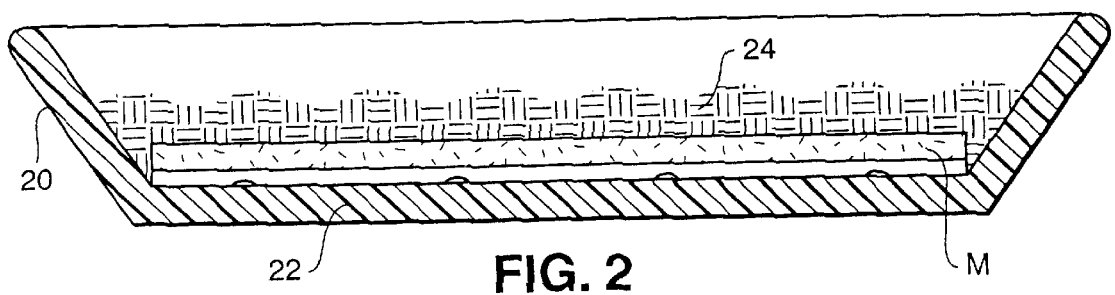
Figure 3:
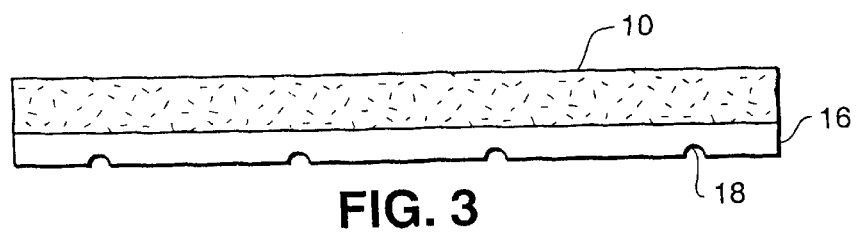
Figure 4:
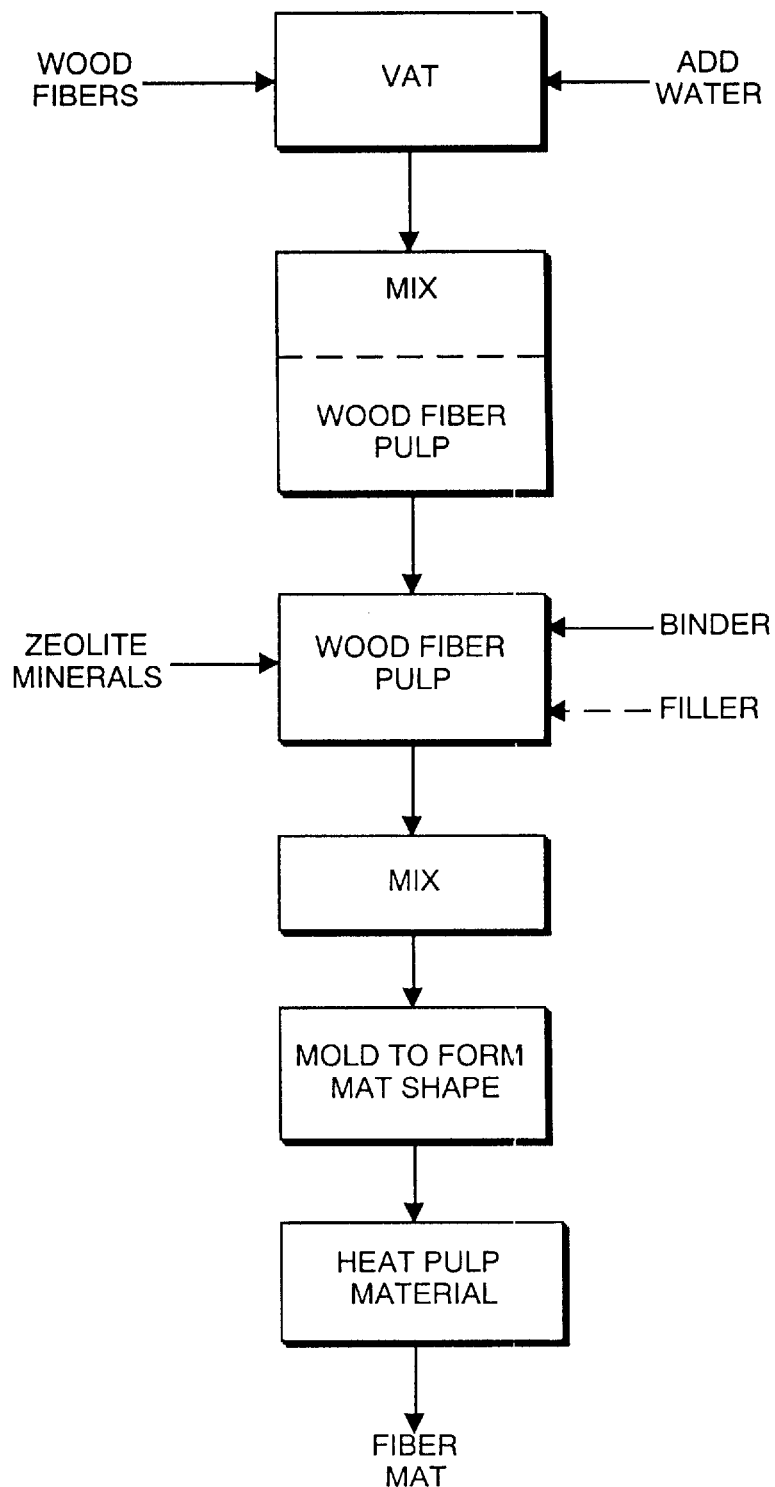

Having thus described the invention in general terms, reference will now be made to the accompanying drawings in which:

FIG. 1 is a perspective view of a mat constructed in accordance with and embracing the present invention, and which is capable of absorbing and entrapping odors;

FIG. 2 is a sectional view showing the use of the mat of the present invention in a litter box;

FIG. 3 is a side elevational view which showing one embodiment of the mat of the present invention; and FIG. 4 is a schematic diagrammatic view showing the steps involved in the making of the mat of the present invention.

DETAILED DESCRIPTION OF A PREFERRED EMBODIMENT

Referring now in more detail and by reference characters to the drawings, which illustrate a preferred embodiment of the present invention, M designates a mat or pad for disposition in a position in which it can receive and collect liquid discharge from an animal and odors arising from the discharge of an animal. In the case of the present invention, the mat or pad M is designed for use in any environment where an animal may discharge urine or excreta. Thus, for example, the mat M may be designed for use in the bottom of a litter box, or on the floor of a bird cage or the like.

In the embodiment as illustrated in FIG. 1, the mat is generally rectangular in shape although it may adopt essentially any size and any shape to conform to the environment in which it would be used. The mat is also preferably about one-fourth inch thick although the thickness can range from about one-eighth inch to about one-half inch.

The mat normally has an upper surface 10, along with a generally rectangularly shaped peripheral side wall 12. Moreover, the upper surface is generally a flat or relatively flat surface. However, for cats and similar animals, the entire mat or at least the upper portion is provided with somewhat of a firm fiber textured surface in order to enable a cat or like animal to scratch at the surface.

The mat, in its outward appearance, is generally fibrous, somewhat resembling a conventional textured sound board or the back surface of acoustic ceiling tiles, and particularly those tiles containing plaster or gypsum. Nevertheless, the mat of the present invention is formed of a wood fiber or other firm fibrous material, as hereinafter described, and which is thoroughly impregnated with an odor-adsorbing zeolite mineral during the formation thereof, also in a manner as hereinafter described in more detail. In accordance with this construction, the mat is capable of absorbing a substantial amount of liquid discharge of an animal. Moreover, the mat is also capable of adsorbing odors which emanate from the discharge of that animal, whether it be solid discharge or liquid discharge. In this case, the odors are completely adsorbed by the zeolite mineral incorporated in the mat.

The zeolite minerals which may be used include either the natural zeolites or the synthetic zeolites. Some of the natural zeolites which can be used include chabazite and mordenite, which are aluminum oxide-silica oxide hydrated metal salts, as well as erionite and clinoptilolite. Some of the synthetic zeolites which can be used include a zeolite A, zeolite X, zeolite Y, zeolite L, zeolite omega and ZSM-5. Most of these minerals are calcium, sodium or potassium salts of aluminum oxides, silicon oxides and the like and are usually hydrated.

There are approximately forty known zeolite minerals. Many of the zeolites may be used in the mat of the present invention. However, it is necessary for any selected zeolite to be relatively non-toxic to animals, even if ingested.

Most of these zeolites have internal pore systems comprised of interconnected cage-like voids. These voids provide a system of uniform channels, which in some cases, are one dimensional, and in other cases, intersect with similar channels to provide a two and three dimensional channel system. The structures are primarily tetrahedral, although in many cases structural defects or variations exist.

The zeolites are also highly effective in the present invention because they are capable of separating molecules based on size and configuration of the molecules relative to size and geometry of their main structures. Because of their structure, the zeolites have been found to be particularly effective in absorbing liquid molecules, and particularly, those where the permanent dipole moment show interaction effects.

As indicated previously, the mordenite is a preferred natural zeolite mineral, and is high in silicate salts and calcium salts. Furthermore, it is desirably low in aluminum oxide and ferric oxide content. Moreover, while the mat is capable of absorbing wetness and adsorbing odors, the mineral itself is capable of actually adsorbing some of the bacteria associated with excrement and urine from an animal. The mat, while being sufficiently porous, is nevertheless durable to withstanding the clawing associated with a pet's attempt to bury.

The mat itself is formed of a non-toxic and non-metallic fibrous material, and a zeolite mineral containing a vitreous silicon properties for odor adsorption, as well as a non-pigmented acrylic latex binding agent, as hereinafter described. The fibers are primarily designed to contribute pliability, strength, and water-absorption properties.

Any material having a firm fiber structure which is relatively non-toxic may be employed as the base material. Any of a number of fiber materials may be used as the base material in the mat of the invention. In effect, this fibrous material forms the entire base for holding the zeolite mineral and which is all bound together by use of a binder and preferably, although not necessarily, a non-pigmented binder. However, some of the most preferred fiber materials which have been found to be effective in the invention include the cellulosic fibers, such as wood fibers, pulp paper and the like. Many of the natural fibers are highly effective and include, for example, cotton fibers, hemp, peat and other fibers used in the formation of fabrics. Coconut shells have also been found to be effective for use in the invention. When forming the mat, it is important to have a surface somewhat similar to that of textured wall board, that is, with somewhat of a coarse surface thereon.

The binder is preferably an acrylic latex material since it is non-toxic and is not an irritant to any pet animal. However, other binding materials, such as sodium silicate, may be used. It is also possible to use other known binding agents such as a methyl cellulose and the like. However, with some binders, the problem of toxicity will begin to arise. Consequently, it is preferable to employ only a binder which is non-toxic to an animal in case the animal attempts to ingest some of the pad and is not an irritant to the animal.

In the embodiment of the mat as shown in FIG. 1, it is provided with a backing 16 since the mat itself does not have a strong amount of structural integrity due to the fact that the fibers, such as wood fibers, and the mineral are only held together by a binder, and in some cases, it may be desirable to provide this backing 16. The backing will provide some structural integrity and will also allow a hinging. For this purpose, the backing 16 may be provided with notches 18, as best shown in FIG. 3. In place of the notches, score lines or the like could also be used. The backing 16 is preferably formed of a paper or paperboard material, although other flexible and bendable backing materials could be used. The scored or notched areas will allow for folding of the mat in order to conserve packaging storage and reduce the potential for damage if produced as a single flat sheet.

FIG. 2 illustrates the mat M disposed within a conventional litter box 20. In the normal use of the mat, the mat would be laid onto the upper surface of the bottom wall 22 of this litter box and a cat litter 24 would be disposed over the mat M. The cat litter 24 is typically capable of absorbing a substantial amount of liquid such as a urine from an animal. However, in the event that there was insufficient litter or that there were open spaces in the litter box which were not covered by the litter, the mat M would thereupon absorb that extra liquid.

The pad itself, when formed, is relatively light in weight since the fibers in the pad are not very dense. Indeed, they are not necessarily pressed although they could be pressed into a desired shape and into a more densed format, if desired. With regard to the major content of the mat, that is preferably a fibrous material such as a cellulosic fiber, as aforesaid.

The zeolite which is used has a major quantity of vitreous silicon oxide. When a mordenite is used, the silicon oxide exists in an amount of about 65 percent with aluminum oxide being present in an amount of about 15 percent, by weight. There are various other metal oxides which are also present but in relatively minor amounts. The iron oxide, which is not desirable, is often present in an amount of about 4 to 4.8 percent. Magnesium oxide, calcium oxide, sodium oxide, potassium oxide, titanium oxide and manganese oxide are often present but in very minor amounts.

The final mat is usually comprised of about 30 percent of wood fiber by weight, and about 70 percent of the zeolite mineral. The binding agent exists only in relatively minor amounts, such as, for example, 0.5 percent by volume. In a weight percentage, the binding agent may be present in an amount of about 0.2% to about 5% by weight and preferably in an amount of about 0.29% to about 2% by weight. The wood fiber or other fiber base material can vary from about 15 percent to about 50 percent with the zeolite varying from about 50 percent to about 80 percent by weight. However, it is preferable to employ at least about 30 percent of the fiber in order to provide a greater structural integrity to the mat.

FIG. 4 shows the steps involved in the formation of the mat. Usually, the wood fiber or other fiber is added to water in a vat. For this purpose, cellulosic fibers, such as wood fibers, are preferred. Typically, in the formation stage, about 10 percent of the volume contained in the vat would be water. Only a relatively small quantity of water is needed in order to form a slurry of the wood fiber so that fibers exist in the form of a pulp. Mixing of the fibers with the water may occur in order to form the fiber pulp. Thereafter, the zeolite mineral and the binder are added to the wood fiber pulp. Optionally, a filler material such as papier mache or the like may be added. Other cellulosic materials are effective for this purpose. The binder and the filler along with the zeolite mineral is then mixed. The slurry is then introduced into a press mold which will impart to the mix the final shape of the mat. Thus, and for this purpose, the mold can be simply a rectangularly shaped pan if the mat itself is to adopt a rectangular shape. The slurry is then heated in order to expel the water and thereby form the final mat.

In a preferred form of the invention, the wet slurry is preferably introduced into a press mold. When the mold is operating, the water or other liquid contained within the slurry is then drained from the slurry through a screen existing in the mold. Moreover, the wet slurry can then be formed into the desired mat shape and size during the drawing process. In the press molding operation, the screen forming part of the mold is preferably heated with a low voltage heat.

In many cases, it may be desirable to employ agitation in order to provide a uniform blend of the fibrous material and the zeolite mineral, as well as the binding agent. Typically, when using a cellulosic fiber, agitation will only be required for a relatively short period of time, as for example, for three minutes or so.

In essence, the process used has some similarities to the cold mix process used in the paper industry. The cold mix process or so-called "cold lay-up" process is frequently used in the formation of papers and for that matter other cellular products, such as female sanitary pads. Since the present invention utilizes essentially no heating except to dry off the water, it typically adopts some of the form of the so-called "cold mix" process.

The mat itself can be used for a fairly long period of time, based on a normal use of one animal using the litter box. The use of the mat will nevertheless substantially extend the effective life of litter which may be used in a litter box. After that period of time, the mat itself may become saturated with urine and even moreso, the odor adsorbing capabilities will be reduced and can even reverse thereby releasing some of the odors. When odor adsorption has reached a maximum, the release of odors will start and that is a good time to recycle or replace the mat.

The mat can be recycled merely by air drying to permit evaporation of the moisture and elimination of the odors. The elimination of the odors causes an exchange of oxygen from the air. In some cases, the mat can be regenerated or reactivated with several days of air drying, although complete regeneration or reactivation usually requires an air drying for about the period of time that the mat was actually used.

Thus, there has been illustrated and described a unique and novel pet odor absorbing mat and which fulfills all of the objects and advantages which have been sought. It should be understood that many changes, modifications, variations and other uses and applications will become apparent to those skilled in the art after considering the specification and the accompanying drawings. Therefore, any and all such changes, modifications, variations and other uses and applications which do not depart from the scope of the invention are deemed to be covered by the invention.

Having thus described the invention, what I desire to claim and secure by Letters Patent is:

1. An odor adsorbing and moisture absorbing mat for use in an environment where animal urine and exreta will come into contact with or be deposited in close proximity thereto, said mat comprising:
   a) a firm fiber base material forming a base structure of said mat having a pair of opposed surfaces and a continuous side wall and with the region therebetween being largely filled with the base material, such that the base material thoroughly fills the mat and extends between the opposed surfaces, said mat being formed of a fiber base material capable of having a zeolite mineral thoroughly contacting the fiber base material; and
   b) a zeolite mineral impregnated throughout said base material and where the mineral is capable of adsorbing the odors emanating from an animal discharge and also absorbing some liquid discharge of the animal and the fiber base material is capable of absorbing the liquid discharge of the animal.

2. The odor adsorbing and moisture absorbing mat of claim 1 further characterized in that the zeolite mineral is a vitreous silicon containing salt mineral.

3. The odor adsorbing and moisture absorbing mat of claim 2 further characterized in that the zeolite mineral is a mordenite zeolite.

4. The odor adsorbing and moisture absorbing mat of claim 3 further characterized in that the fiber base material is a cellulosic fiber base material.

5. The odor adsorbing and moisture absorbing mat of claim 4 further characterized in that the cellulosic fiber base material is a wood fiber.

6. The odor adsorbing and moisture absorbing mat of claim 5 further characterized in that the mat comprises a binding agent for holding the mineral with the base material.

7. The odor adsorbing and moisture absorbing mat of claim 4 further characterized in that the mineral comprises a substantial quantity of silicon oxide in excess of 50 percent of the weight of the mineral and relatively small quantities of metal oxides.

8. The odor absorbing and moisture absorbing mat of claim 7 further characterized in that the metal oxides are less than 10 percent by weight of the mineral.

9. The odor adsorbing and moisture absorbing mat of claim 4 further characterized in that the mat also comprises a cellulosic filler material.

10. The process of making a pet animal odor adsorbing and moisture absorbing mat of claim 9 further characterized in that said step of generating a fibrous pulp comprises the generating of a pulp from cellulosic fiber.

11. The process of making a pet animal at odor adsorbing and moisture absorbing mat of claim 10 further characterized in that the process comprises the adding of said slurry to a press mold to form the final shape of the mat.

12. The process of making a pet animal odor adsorbing and moisture absorbing mat of claim 11 further characterized in that said process comprises adding an acrylic latex binding agent.

13. The odor adsorbing and moisture absorbing mat of claim 3 further characterized in that the fiber base material is a cellulosic wood fiber and the mat comprises wood fiber in an amount of about 15 percent to about 50 percent by weight and a binding agent in an amount of about 5.0 percent to about 0.2 percent by weight and the mineral in an amount of about 50 percent to about 70 percent by weight.

14. The odor adsorbing and moisture absorbing mat of claim 1 further characterized in that the mineral also absorbs some of the microorganisms associated with urine and excrement of an animal.

15. A process of making a pet animal odor adsorbing and moisture absorbing mat for absorbing moisture in the discharge of an animal and adsorbing a substantial portion of the odors emanating from both solid and liquid discharge from an animal, said process comprising:
   a) generating a viscous but yet liquid fibrous pulp with fibers mixed with water to form a viscous pulp slurry;
   b) adding to the pulp slurry a zeolite mineral having properties to adsorb odor from animal waste;
   c) adding to the pulp slurry and the mineral a binding agent to cause the mineral to become bound to the fibrous pulp in the viscous slurry;

d) heating the slurry of pulp, binding agent and mineral after addition of the binding agent and mineral such that the mineral is thoroughly impregnated throughout the pulp, the temperature in the heating being sufficient to drive off water without damaging the mineral and cause solidification of the slurry into a mat.

16. The process of making a pet animal odor adsorbing and moisture absorbing mat of claim 15 further characterized in that the mineral comprises a substantial quantity of silicon oxide in excess of 50% of the weight of the mineral and relatively small quantities of metal oxides.

17. The process of making a pet animal odor adsorbing and moisture absorbing mat of claim 16 further characterized in that the metal oxides are less than about 10 percent by weight of the mineral.

18. The process of making a pet animal odor adsorbing and moisture absorbing mat of claim 17 further characterized in that the mineral is mordenite.

19. The process of making a pet animal odor adsorbing and moisture absorbing mat of claim 18 further characterized in that the fiber is a cellulosic wood fiber and the mat comprises the wood fiber in an amount of about 15 percent to about 50 percent by weight and a binding agent in an amount of about no more than 5.0 percent to about 0.2 percent by weight and the mineral in an amount of about 50 percent to about 70 percent by weight.

20. The process of claim 15 further characterized in that step of heating the mixture in the process comprises press heating the mixture to drive off all water by forcing the water through a screen.

21. An odor adsorbing and moisture absorbing mat for use in an environment where animal urine and exreta will come into contact with or be deposited in close proximity thereto, said mat comprising:
   a) a firm cellulosic wood fiber base material forming the base structure of said mat and being present in an amount of about 15 percent to about 50 percent by weight;
   b) a binding agent present in an amount of about 5.0 percent to about 0.2 percent by weight; and
   c) a mordenite vitreous silicon containing zeolite mineral incorporated in said base structure and being present in an amount of about 50 percent to about 70 percent by weight, said fiber base material and binding agent and mineral being formed into the size and shape of a mat and where the mineral is capable of adsorbing the odors emanating from an animal discharge and also absorbing some liquid discharge of the animal and the fiber base material is capable of absorbing the liquid discharge of the animal.

22. The odor adsorbing and moisture absorbing mat of claim 21 further characterized in that the mineral also absorbs some of the microorganisms associated with urine and excrement of an animal.

23. The odor adsorbing and moisture absorbing mat of claim 21 further characterized in that the mat also comprises a cellulosic filler material.

24. A process of making a pet animal odor adsorbing and moisture absorbing mat for absorbing moisture in the discharge of an animal and adsorbing a substantial portion of the odors emanating from both solid and liquid discharge from an animal, said process comprising:
   a) generating a viscous but yet liquid cellulosic wood fiber pulp and where the fiber in said pulp is present in an amount of about 15 percent to about 50 percent by weight;
   b) adding to the pulp a mordenite zeolite mineral having properties to adsorb odor from animal waste, said mineral being present in an amount of about 50 percent by weight to about 70 percent by weight and which has a substantial quantity of silicon oxide in excess of 50 percent of the weight of the components forming the mineral and with metal oxides being less than 10 percent by weight of the mineral;
   c) adding to the pulp and the mineral a binding agent in an amount of about no more than 5.0 percent to about 0.2 percent by weight to cause the mineral to become bound to the pulp; and
   d) heating the mixture of pulp, binding agent and mineral to drive off water and cause solidification of the mixture into a mat.

25. The process of making a pet animal odor adsorbing and moisture adsorbing mat of claim 24 further characterized in that said process comprises adding an acrylic latex binding agent.

26. The process of claim 24 further characterized in that step of heating the mixture in the process comprises press heating the mixture to drive off all water by forcing the water through a screen.

27. An odor adsorbing and moisture absorbing mat for use in an environment where animal urine and exreta will come into contact with or be deposited in close proximity thereto, said mat comprising:
   a) a firm cellulosic fiber base material forming the base structure of said mat and being present in an amount of about 15 percent to about 50 percent by weight;
   b) a binding agent present in an amount of about 5.0 percent to about 0.2 percent by weight; and
   c) a zeolite mineral incorporated in said base material and being present in an amount of about 50 percent to about 70 percent by weight, said fiber base material and binding agent and mineral being formed into the size and shape of a mat and where the mineral is capable of adsorbing the odors emanating from an animal discharge and also absorbing some liquid discharge of the animal and the fiber base material is capable of absorbing the liquid discharge of the animal.

28. A process of making a pet animal odor adsorbing and moisture absorbing mat for absorbing moisture in the discharge of an animal and adsorbing a substantial portion of the odors emanating from both solid and liquid discharge from an animal, said process comprising:
   a) generating a viscous but yet liquid cellulosic fiber pulp and where the fiber in said pulp is present in an amount of about 15 percent to about 50 percent by weight;
   b) adding to the pulp a zeolite mineral having properties to adsorb odor from animal waste, said mineral being present in an amount of about 50 percent by weight to about 70 percent by weight and which has an substantial quantity of silicon oxide forming the mineral;
   c) adding to the pulp and the mineral a binding agent in an amount of about no more than 5.0 percent to about 0.2 percent by weight to cause the mineral to become bound to the fiber pulp; and
   d) heating the mixture of pulp, binding agent and mineral to drive off water and cause solidification of the mixture into a mat.

29. An odor adsorbing and moisture absorbing mat for use in an environment where animal urine and exreta will come into contact with or be deposited in close proximity thereto, said mat comprising:

a) a firm cellulosic wood fiber base material forming the base structure of said mat;

b) a mordenite vitreous silicon containing zeolite mineral incorporated in said base material and formed into the size and shape of a mat and where the mineral is capable of adsorbing the odors emanating from an animal discharge and also absorbing some liquid discharge of the animal and the fiber base material is capable of absorbing the liquid discharge of the animal; and c) binding agent to enable binding of the mineral to the fiber base material.

30. A process of making a pet animal odor adsorbing and moisture absorbing mat for absorbing moisture in the discharge of an animal and adsorbing a substantial portion of the odors emanating from both solid and liquid discharge from an animal, said process comprising:

a) generating a viscous but yet liquid cellulosic wood fibrous pulp;

b) adding to the pulp a mordenite zeolite mineral having properties to adsorb odor from animal waste;

c) adding to the pulp and the mineral a binding agent forming a mixture thereof and to cause the mineral to become bound to the fibrous pulp; and d) heating the mixture of pulp, binding agent and mineral to drive off water and cause solidification of the mixture into a mat.

* * * * *